US009015080B2

(12) United States Patent
Joshi et al.

(10) Patent No.: US 9,015,080 B2
(45) Date of Patent: Apr. 21, 2015

(54) SYSTEMS AND METHODS FOR SEMANTIC INFERENCE AND REASONING

(75) Inventors: Sameer Joshi, Annapolis, MD (US); Todd Pehle, Annapolis, MD (US); Larry Crochet, Orlando, FL (US)

(73) Assignee: Orbis Technologies, Inc., Annapolis, MD (US)

( * ) Notice: Subject to any disclaimer, the term of this patent is extended or adjusted under 35 U.S.C. 154(b) by 298 days.

(21) Appl. No.: 13/422,962

(22) Filed: Mar. 16, 2012

(65) Prior Publication Data

US 2013/0246315 A1 Sep. 19, 2013

(51) Int. Cl.

| | |
|---|---|
| ***G06N 5/02*** | (2006.01) |
| ***G06N 99/00*** | (2010.01) |
| ***G06N 5/04*** | (2006.01) |

(52) U.S. Cl.

CPC ................ *G06N 99/005* (2013.01); *G06N 5/04* (2013.01)

(58) Field of Classification Search

CPC ........................................................ G06N 5/04
USPC ...................................................... 706/10, 55
See application file for complete search history.

(56) References Cited

U.S. PATENT DOCUMENTS

| | | | |
|---|---|---|---|
| 6,119,124 | A | 9/2000 | Broder et al. |
| 6,189,002 | B1 | 2/2001 | Roitblat et al. |
| 6,230,155 | B1 | 5/2001 | Broder et al. |
| 6,240,409 | B1 | 5/2001 | Aiken |
| 6,349,296 | B1 | 2/2002 | Broder et al. |
| 6,654,739 | B1 | 11/2003 | Apte et al. |
| 6,658,423 | B1 | 12/2003 | Pugh et al. |
| 6,678,694 | B1 | 1/2004 | Zimmermann et al. |
| 6,727,927 | B1 | 4/2004 | Dempski et al. |
| 6,751,628 | B2 | 6/2004 | Coady |
| 6,820,075 | B2 | 11/2004 | Shanahan et al. |
| 7,035,876 | B2 | 4/2006 | Kawai et al. |
| 7,139,756 | B2 | 11/2006 | Cooper et al. |
| 7,158,980 | B2 | 1/2007 | Shen |
| 7,346,491 | B2 | 3/2008 | Kanagasabai et al. |
| 7,392,175 | B2 | 6/2008 | Kawatani |
| 7,392,262 | B1 | 6/2008 | Alspector et al. |
| 7,574,348 | B2 | 8/2009 | Hon et al. |

(Continued)

OTHER PUBLICATIONS

International Search Report issued in International Appln. No. PCT/US12/29395 mailed Jun. 13, 2012, 2 pages.

(Continued)

*Primary Examiner* — Jeffrey A Gaffin
*Assistant Examiner* — Ola Olude-Afolabi
(74) *Attorney, Agent, or Firm* — Rothwell, Figg, Ernst & Manbeck, p.c.

(57) ABSTRACT

A method and system for analyzing a corpus of data artifacts is disclosed. The method comprises obtaining, by a computer, a semantic representation of the data artifacts, where the semantic representation indicates (1) entities identified in the data artifacts, and (2) semantic relationships among the entities as indicated by the data artifacts. The method further comprises clustering the data artifacts into clusters of semantically related data artifacts based on the semantic representation and inferring additional semantic relationships between pairs of the entities. The inferring comprises applying, on a cluster-by-cluster basis, a multi-tiered network of inference engines to a portion of the semantic representation corresponding to the cluster, where the multi-tiered network of inference engines includes a domain-independent inference tier and a domain-specific inference tier.

21 Claims, 13 Drawing Sheets

(56) References Cited

U.S. PATENT DOCUMENTS

| | | | |
|---|---|---|---|
| 7,954,151 | B1 | 5/2011 | Nisbet et al. |
| 8,275,546 | B2 | 9/2012 | Xiao et al. |
| 8,281,246 | B2 | 10/2012 | Xiao et al. |
| 8,380,719 | B2 | 2/2013 | Chang et al. |
| 8,521,762 | B2 | 8/2013 | Humphreys et al. |
| 8,572,076 | B2 | 10/2013 | Xiao et al. |
| 2001/0037328 | A1 | 11/2001 | Pustejovsky et al. |
| 2002/0087408 | A1 | 7/2002 | Burnett |
| 2003/0028564 | A1 | 2/2003 | Sanfilippo |
| 2004/0044952 | A1 | 3/2004 | Jiang et al. |
| 2004/0243403 | A1 | 12/2004 | Matsunaga et al. |
| 2005/0060305 | A1 | 3/2005 | Hopkins et al. |
| 2005/0091537 | A1 | 4/2005 | Nisbet et al. |
| 2005/0108001 | A1 | 5/2005 | Aarskog |
| 2005/0125429 | A1 | 6/2005 | Corston-Oliver et al. |
| 2005/0165600 | A1 | 7/2005 | Kasravi et al. |
| 2006/0036593 | A1 | 2/2006 | Dean et al. |
| 2006/0167930 | A1 | 7/2006 | Witwer et al. |
| 2006/0271526 | A1 | 11/2006 | Charnock et al. |
| 2007/0106499 | A1 | 5/2007 | Dahlgren et al. |
| 2007/0128899 | A1 | 6/2007 | Mayer |
| 2007/0208719 | A1 | 9/2007 | Tran |
| 2007/0294610 | A1 | 12/2007 | Ching |
| 2008/0071519 | A1 | 3/2008 | Brun et al. |
| 2008/0114750 | A1 | 5/2008 | Saxena et al. |
| 2008/0133488 | A1 | 6/2008 | Bandaru et al. |
| 2008/0177994 | A1 | 7/2008 | Mayer |
| 2008/0249764 | A1 | 10/2008 | Huang et al. |
| 2008/0294624 | A1 | 11/2008 | Kanigsberg et al. |
| 2009/0012984 | A1 | 1/2009 | Ravid et al. |
| 2009/0070103 | A1 | 3/2009 | Beggelman et al. |
| 2009/0070326 | A1 | 3/2009 | Kraft |
| 2009/0089277 | A1 | 4/2009 | Cheslow |
| 2009/0132530 | A1 | 5/2009 | Chen et al. |
| 2010/0010968 | A1 | 1/2010 | Redlich et al. |
| 2010/0042576 | A1 | 2/2010 | Roettger et al. |
| 2010/0050118 | A1 | 2/2010 | Chowdhury et al. |
| 2010/0050131 | A1 | 2/2010 | Weise et al. |
| 2010/0057664 | A1* | 3/2010 | Sweeney et al. ................ 706/55 |
| 2010/0063966 | A1 | 3/2010 | Lemoine et al. |
| 2010/0076972 | A1 | 3/2010 | Baron et al. |
| 2010/0082331 | A1 | 4/2010 | Brun et al. |
| 2010/0082634 | A1 | 4/2010 | Leban |
| 2010/0191748 | A1 | 7/2010 | Martin et al. |
| 2010/0198864 | A1 | 8/2010 | Ravid et al. |
| 2010/0235353 | A1 | 9/2010 | Warnock et al. |
| 2010/0250578 | A1 | 9/2010 | Athsani et al. |
| 2010/0262599 | A1 | 10/2010 | Nitz |
| 2010/0287148 | A1 | 11/2010 | Resnick et al. |
| 2011/0087686 | A1 | 4/2011 | Brewer et al. |
| 2011/0225159 | A1 | 9/2011 | Murray |
| 2011/0258193 | A1 | 10/2011 | Brdiczka et al. |
| 2011/0270606 | A1 | 11/2011 | Crochet et al. |
| 2011/0270888 | A1 | 11/2011 | Crochet et al. |
| 2011/0271232 | A1 | 11/2011 | Crochet et al. |
| 2012/0150835 | A1 | 6/2012 | Bobick et al. |
| 2012/0226707 | A1 | 9/2012 | Brun et al. |
| 2013/0144874 | A1 | 6/2013 | Koperda et al. |
| 2013/0246315 | A1 | 9/2013 | Joshi et al. |

OTHER PUBLICATIONS

"Bigdata® Scale-Out Architecture: Whitepaper," Systap, LLC, Oct. 13, 2009, 30 pages.

Lattanzi, S., et al., "Filtering: a method for solving graph problems in mapreduce," SPAA'11, San Jose, CA, Jun. 4-6, 2011, 10 pages.

Lin, J., "Brute force and indexed approaches to pairwise document similarity comparisons with mapreduce," SIGIR'09, Boston, MA, Jul. 19-23, 2009, 8 pages.

Mayfield, J., et al., "Cross-document coreference resolution: a key technology for learning by reading," AAAI, 2009, 6 pages.

Punin, J. and M. Krishnamoorthy, "Describing structure and semantics of graphs using an RDF vocabulary," Proceedings of Extreme Markup Languages®, http://conferences.idealliance.org/extreme/html/2001/Punin01/EML2001Punin01.html, [accessed Jul. 15, 2014], 16 pages.

Rohloff, K. and R. E. Schantz, "Clause-iteration with mapreduce to scalably query data graphs in the SHARD graph-store," DIDC'11, San Jose, CA, Jun. 8, 2011, 10 pages.

Stupar, A. et al., "Rankreduce—processing k-nearest neighbor queries on top of mapreduce," LSDS-IR Workshop, Geneva, Switzerland, Jul. 2010, 6 pages.

González Moriyón, G., "Disaster Data Interoperability Solution at Stakeholders Emergency Reaction 285069," D4.10 Algorithms and Technology for Data Mediation State of the Art, Seventh Framework Programme, Jul. 30, 2012. 84 pages.

International Search Report dated May 22, 2014, for PCT Application No. PCT/US2013/072292, 1 page.

Choi, N. et al., "A Survey on Ontology Mapping," SIGMOD Record, 35(3):34-41, Sep. 2006.

Shum et al., "ScholOnto: an ontology-based digital library server for research documents and discourse", Int. J. Digit. Libr, 3, 2000. pp. 237-248; Published online: Sep. 22, 2000. Retrieved from <http://download.springer.com/> on <May 28, 2014>.

Uren et al., "Sensemaking tools for understanding research literatures: Design, implementation and user evaluation," Int. J. Human-Computer Studies 64, 2006, pp. 420-445; Available online Nov. 16, 2005. Retrieved from <www.sciencedirecty.com> on <May 28, 2014>.

Finkel et al., "Incorporating Non-local Information into Information Extraction Systems by Gibbs Sampling", computer science department, Stanford University, (ACL 2005), pp. 363-370.

Ingersoll et al., "Taming Text". How to find, Organize, and Manipulate It, Manning Pubiications, Jan. 2012, 24 pages.

Apache Software Foundation, "Apache OpenNLP Developer Documentation", 2010, pp. 1-27.

Rivest, "The MD5 Message-Digest Algorithm", MIT Laboratory for Computer Science and RSA Data Security, Inc., Apr. 1992, pp. 1-21.

Dean et al., "MapReduce: Simplified Data Processing on Large Clusters", USENIX Association, OSDI '04: 6th Symposium on Operating Systems Design and Implementation, 2008, pp. 137-149.

White et al., "Hadoop: The Definitive Guide MapReduce for the Cloud—MapReduce for the Cioud", May 2009, 1 page.

Manning et al., "An Introduction to Information Retrieval", Cambridge University Press. (c) 2009, pp. 1-544.

Apache Software Foundation, "Cassandra", The Apache Cassandra Project, 2009, pp. 1-3.

Fukumoto et al., "Oki Electric industry: Description of the Oki System as Used for MUC-7", Kansai Lab, R&D group, 1998. pp. 1-7.

Garigliano et al., "University of Durham: Description of the Lolita System as used in MUC-7", Laboratory for Natural Language Engineering, Department of Computer Science, 1995, pp. 1-16.

Lin, "Using Collocation Statistic in Information Extraction" Department of Computer Science, University of Manitoba, 1988, pp. 1-10.

Humphreys et al., "University of Sheffield: Description of the LaSIE-II System as Used for MUC-7", Department of Computer Science, University of Sheffield, 1998, pp. 1-20.

Huyck, "Description of the American University in Cairo's System Used for MUC-7", the American University in Cairo, 1998, pp. 1-13.

Miller et al., "Algorithms that Learn to Extract Information BBN: Description of the Sift System as used for MUC-7", BBN Technologies, 1998, pp. 1-17.

Brady et al., "Description of Lockheed Martin's ML Toolset as Applied to MUC-7 (AATM7)", 1998, pp. 1-12.

Yangarber et al., "NYU: Description of the Proteus/PET System as Used for MUC-7 ST", Computer Science Department, New York University, 1998, pp. 1-7.

Aone et al., "SRA: Description of the IE2 System Used for MUC-7", 1998, pp. 1-14.

Patten et al., "Description of the Tasc System Used for MUC-7", TASC, 1998, pp. 1-5.

Black et al., "Facile: Description of the NE System used for MUC-7", Department Language Engineering, 1998, pp. 1-10.

Krupka et al., "IsoQuest, Inc.: Description of the NetOwlTM Extractor System as Used for MUC-7", 1998, pp. 1-10.

Yu et al., "Description of the Kent Ridge Digital Labs System Used for MUC-7", 1998, pp. 1-9.

(56) References Cited

OTHER PUBLICATIONS

Chen et al., "Decription of the NTU System Used for Met2", Natural Language Processing Laboratory, Department of Computer Science and Information Engineering National Taiwan University, 1998, pp. 1-9.
Borthwick et al., "NYU: Description of the MENE Named Entity System as Used n MUC-7", Computer Science Department, New York University, 1998, pp. 1-12.
Fukumoto et al., "Oki Electric Industry: Description of the Oki System as Used or MET-2", Kansai Lab., R&D group, 1998, pp. 1-6.
Mikheev et al., "Description of the LTG System Used for MUC-7", HCRC Language Technology Group, 1998, pp. 1-12.
Baldwin et al., "Description of the Upenn Camp System as Used for Coreference", Institute for Research in Cognitive Science, 1998, pp. 1-10.

* cited by examiner

SYSTEMS AND METHODS FOR SEMANTIC INFERENCE AND REASONING

BACKGROUND

1. Field of the Invention

The present invention relates to systems and methods for searching a large corpus of data to identify contextually relevant search results.

2. Description of the Related Art

As the amount of available digital data has exploded, so too has the need for more effective search and retrieval systems. Traditional search and retrieval systems, often referred to as "search engines," typically operate by receiving a textual query of terms and/or phrases (the "search terms"), comparing the search terms against a body of searchable content (the "corpus"), and returning the data items in the corpus that are most relevant to the keywords (the "results"). The classic example of a search engine is an Internet search engine, which indexes web pages and returns the most relevant ones in response to search term queries.

Search and retrieval alone is insufficient to fully understand and utilize the data in a corpus. Traditional keyword search techniques consider only the text of searchable documents in the corpus and ignore other semantically relevant documents that may not include the keywords directly. Accordingly, keyword searching alone may be unable to identify all semantically relevant documents.

Semantic reasoners overcome problems with traditional keyword searching by applying inference algorithms to the content and/or metadata of corpus documents to infer logical consequences. Thus, semantic reasoners can expose connections that are invisible to traditional search engines and thereby allow users to find more relevant content. For example, a semantic reasoner may be able to identify relevant documents in the corpus that do not contain the given search terms but are nevertheless semantically related, to disambiguate entities in the data that have the same or different textual names, reduce the number of results to which a user is exposed, preserve linguistic flexibility in search terms, and enable accurate ranking of query results by trust in source, etc.

Although semantic reasoners provide powerful advantages over traditional search engines, such reasoners have remained impractical for large corpuses such as Internet content, intelligence report databases, corporate document databases, and the like. The inference algorithms applied by traditional semantic reasoners can significantly inflate the already large volume of corpus data, which requires prohibitive storage and/or computing resources. Furthermore, inference algorithms are often brittle and lose accuracy when applied to large volumes of documents that span beyond a single narrow domain (i.e., "the frame problem").

SUMMARY

According to various embodiments, a semantic reasoning method and system is designed to overcome the shortcomings of traditional reasoners by employing a novel multi-stage approach.

In accordance with a first aspect of the present invention, a method for analyzing a corpus of data artifacts is disclosed. The method comprises obtaining, by a computer, a semantic representation of the data artifacts, where the semantic representation indicates (1) entities identified in the data artifacts, and (2) semantic relationships among the entities as indicated by the data artifacts. The method further comprises clustering the data artifacts into clusters of semantically related data artifacts based on the semantic representation and inferring additional semantic relationships between pairs of the entities. The inferring comprises applying, on a cluster-by-cluster basis, a multi-tiered network of inference engines to a portion of the semantic representation corresponding to the cluster, where the multi-tiered network of inference engines includes a domain-independent inference tier and a domain-specific inference tier.

In some embodiments, obtaining the semantic representation may comprise applying natural language processing techniques to extract the entities and relationships from natural language content contained of the data artifacts.

In some embodiments, obtaining the semantic representation comprises determining that the same entity is identified in the artifacts using different identifiers and disambiguating the entity by replacing one or more of the different identifiers with a common identifier for the entity.

In some embodiments, clustering the data artifacts may comprises performing a semantic analysis to determine semantic interrelatedness of the data artifacts based on respective ones of the entities and relationships in the data artifacts and/or performing a syntactic analysis to determine syntactic interrelatedness of the data artifacts based on syntactic overlap of respective content of the data artifacts.

In some embodiments, applying the multi-tiered network of inference engines may comprise applying two or more inference engines sequentially, in parallel, or iteratively according to a static or dynamic schedule, which may be defined in one or more runtime configuration files. In some embodiments, applying the multi-tiered network of inference engines may comprises applying a plurality of domain-independent inference engines in the domain-independent tier and subsequently applying a plurality of inference engines in the domain-specific tier.

In some embodiments, the clustering and inferring may be implemented using a parallel programming and execution model, such as a MapReduce framework.

In accordance with a second aspect of the present invention, a system for analyzing a corpus of data artifacts is disclosed. The system comprises a parallel processing facility comprising a plurality of computer processing cores, and one or more memories coupled to the computer processing cores and storing program instructions executable by the processing cores to implement a semantic inference and reasoning engine. The semantic inference and reasoning engine may be configured to analyze a corpus of data artifacts by: (1) obtaining a semantic representation of the data artifacts, where the semantic representation indicates (a) entities identified in the data artifacts, and (b) semantic relationships among the entities as indicated by the data artifacts; (2) clustering the data artifacts into clusters of semantically related data artifacts based on the semantic representation; and (3) inferring additional semantic relationships between pairs of the entities. The inferring may comprise applying, on a cluster-by-cluster basis, a multi-tiered network of inference engines to a portion of the semantic representation corresponding to the cluster, where the multi-tiered network of inference engines includes a domain-independent inference tier and a domain-specific inference tier.

In some embodiments, the system may include a distributed storage facility coupled to the parallel processing facility and storing the corpus of data artifacts. The storage facility may comprise a distributed file system.

In some embodiments, the parallel processing facility may comprise at least one of: a compute cluster, a superscalar supercomputer, a desktop grid, or a compute cloud. The memories may further store program instructions executable to implement a parallel computation scheduling framework for executing the semantic inference and reasoning engine on the parallel processing facility using a MapReduce pattern.

The above and other aspects and embodiments of the present invention are described below with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

Figure 1:
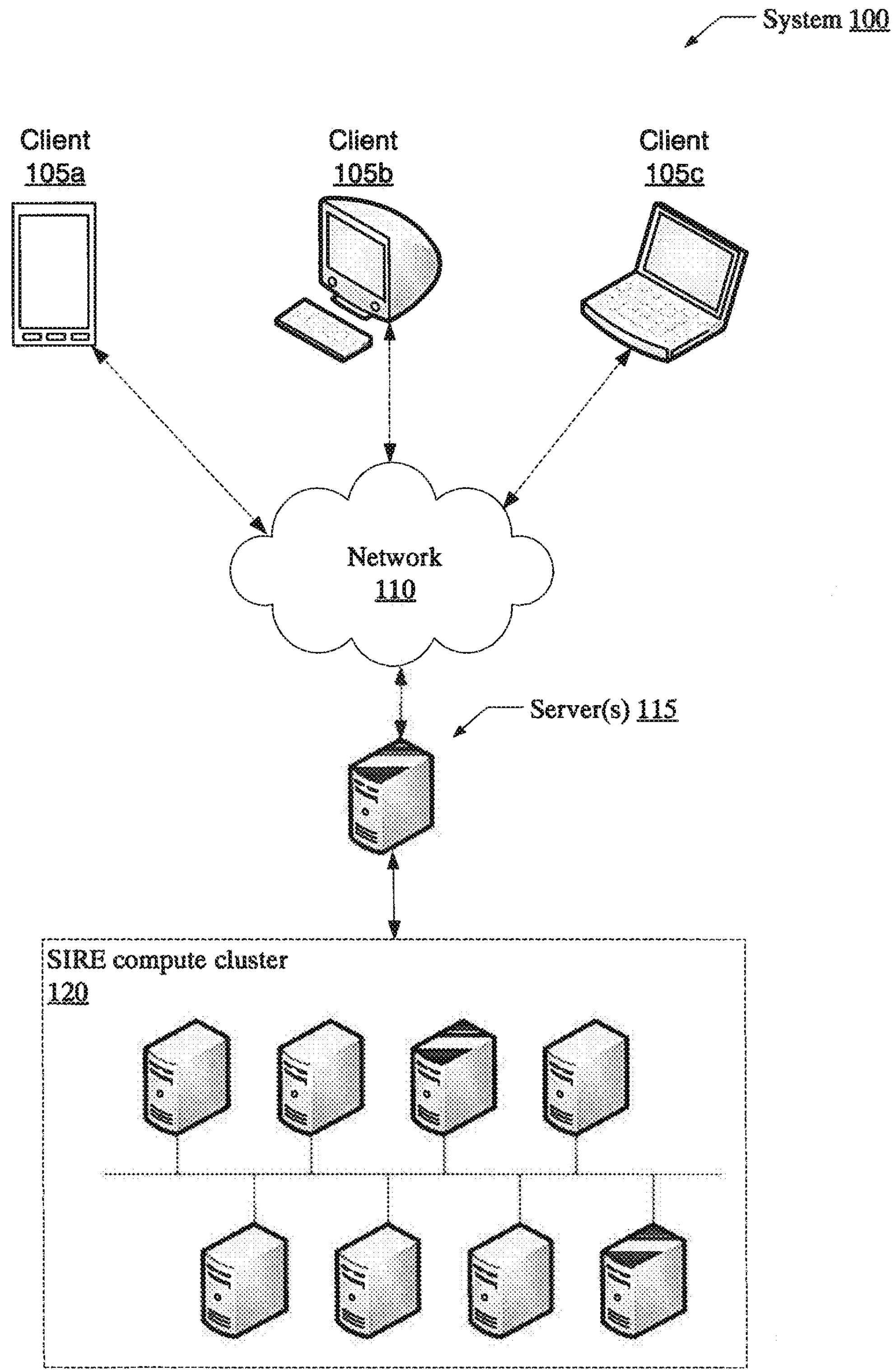
FIG. 1 is a schematic diagram illustrating the hardware environment of a semantic inference and reasoning engine (SIRE), according to some embodiments of the present invention.

According to various embodiments of the present invention, a semantic reasoning method and system is designed to overcome the shortcomings of traditional reasoners by employing a novel multi-stage approach. In some embodiments, a corpus of data artifacts (e.g., natural language documents) may be ingested into the system and converted to a suitable semantic representation, such as a Resource Description Framework document RDF). For purposes of clarity, natural language documents and RDF are used as examples throughout this disclosure. However, it should be understood that in various embodiments, the input may be any data artifacts (e.g., text, semantic document, etc.) and the semantic representation may be described in RDF or in any other suitable semantic representation language.

The input documents may be analyzed to extract entities and their semantic interrelationships, which may be added to the RDF representation. For example, a corpus of natural language intelligence reports may be analyzed via natural language processing to produce an RDF document that identifies people, places, activities, and/or other entities discussed in the document and the semantic relationships among those entities.

In some embodiments, the RDF may then be analyzed to identify clusters of semantically-related documents. The clustering may be based on the entities and semantic interrelationships in the RDF. Thus, documents that are more semantically related to one another are grouped into the same cluster. Semantic relatedness for the purpose of clustering may be measured in various dimensions such that, in some instances, a data artifact (e.g., document) may be part of multiple clusters.

Once the documents are clustered, the system may infer additional semantic relationships by executing various inference algorithms on each document cluster (i.e., on the semantic data corresponding to the documents in the cluster). The system may apply any number of domain-independent and domain-dependent inference techniques sequentially, in parallel, and/or iteratively to infer new relationships between entities. The system may add the new inferences to the semantic representation of the data.

After analyzing the data, as described above, the system may store the data for later query. The semantic data may be stored as RDF, in a relational database, and/or in any other format. The semantic data store may be referred to generally herein as the "semantic database" without limitation to a particular implementation.

After the semantic database is created, the system may later respond to a query for data relating to one or more entities by identifying one or more document-clusters that are related to the queried entities based on the identified and/or inferred semantic relationships.

The system and techniques described herein overcome the shortcomings of traditional reasoners by solving the data explosion problem and the frame problem. The system may mitigate both problems by actively managing data volume through clustering by applying a network of inference techniques to smaller, semantically related document clusters. Furthermore, by using a variety of inference techniques rather than only one, the inference process can be made less brittle and users can be given additional control over the inference workflow. Thus, the system can produce inferences with higher confidence and accuracy by organizing components and inference algorithms into layers that work on different levels of granularity.

FIG. 1 is a schematic diagram illustrating the hardware environment of a semantic inference and reasoning engine (SIRE), according to some embodiments of the present invention.

According to FIG. 1, system 100 implements a client-server model where a plurality of clients 105*a*-105*c* connect to one or more servers 115 via network 110. As illustrated, client hardware may correspond to any computing device, such as mobile device 105*a*, desktop computer 105*b*, or laptop computer 105*c*.

Each of clients 105 may include software for accessing servers 115 via network 110. The particular software necessary may depend on the protocols of network 110 and/or on the interface of servers 115. For example, in some embodiments, clients 105 may utilize web browsers, browser plugins (e.g., widgets), and/or standalone applications to access web pages or web services provided by servers 115. Software executing on clients 105 may permit clients to form requests for data from the corpus, to receive the requested data, and/or to view the data (e.g., as visualizations, etc.).

In various embodiments, network 110 may be implemented by the Internet or any other combination of one or more electronic communication networks, including local area networks (LAN) and/or wide area networks (WAN). The networks may use various protocols, including wireless networking protocols (e.g., WiFi), wired networking protocols (e.g., Ethernet), radio networking protocols (e.g., GSM, LTE), etc., and can be arranged in any configuration (e.g., point-to-point, broadcast, etc.).

Servers 115 may comprise any number of physical and/or virtual machines capable of executing one or more software servers. In some embodiments, servers 115 may be configured to execute software web servers that host one or more web applications and/or one or more web services (e.g., RESTful). The web servers may make such applications and/or services accessible by clients 105 via network 110. For example, servers 115 may expose a web application with a browser-accessible interface that can be delivered to web browsers on clients 105. In some embodiments, servers 115 may host web services accessible by widgets and/or standalone applications executing on clients 105.

System 100 further includes SIRE compute cluster 120. Compute cluster 120 provides storage and computing resources for creating and maintaining the semantic database that stores and analyzes the corpus. Although a cluster is illustrated, the necessary computational and storage resources may be provided by various other architectures for parallel computation and/or storage, such as one or more supercomputers, desktop grids, distributed clusters, and/or other systems.

Cluster 120 may be configured as a commodity cluster, which includes a set of commodity computers networked via an interconnect. The cluster may be controlled by scheduling software, such as by a MapReduce framework (e.g., Hadoop), to perform parallel computations necessary for ingestion and inference computations described herein. The cluster may also be controlled by distributed database and/or file system software, such as Hadoop Distributed File System, to implement a distributed file system on which the semantic data (i.e., semantic database) may be stored. Although servers 115 are illustrated as separate from compute cluster 120, in various embodiments, computers on compute cluster 120 may be used to implement web server functionality.

Figure 2:
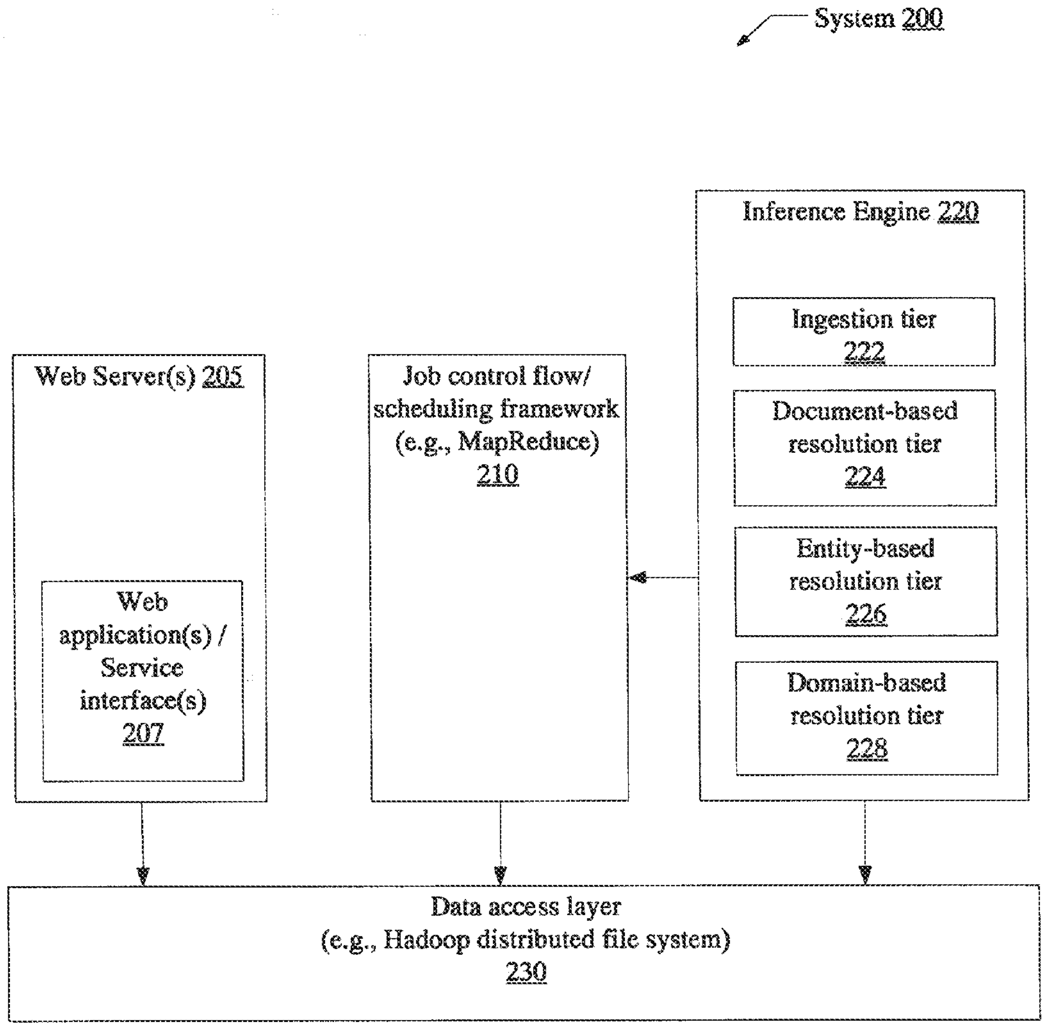
FIG. 2 is a block diagram illustrating the software components of a semantic inference and reasoning engine, according to some embodiments of the present invention.

FIG. 2 is a block diagram illustrating the software components of a semantic inference and reasoning engine, according to some embodiments of the present invention. The components of FIG. 2 may correspond to logical software components configured to execute on compute cluster 120 and/or servers 115.

According to FIG. 2, system 200 includes one or more web servers 205, which are configured to host various web applications and/or services 207. Web servers 205 and web applications/services 207 may execute on servers 115 and/or on computer cluster 120 of FIG. 1.

As described above, web servers 205 may be configured to receive queries regarding various entities and in response, to query the semantic database for data that is most relevant to the queries.

System 200 further includes job control flow/scheduling framework 210. Scheduling framework 210 may be executed on one or more nodes of cluster 120 and may be configured to control how orkflow and/or parallel job execution on the cluster is handled. For example, scheduling framework 210 may be implemented by the Hadoop MapReduce framework. Such a framework may handle the splitting of jobs into smaller jobs and executing the smaller jobs in parallel across the nodes of the cluster. For instance, in MapReduce, jobs may be split into smaller jobs that are executed in parallel across the different nodes of the cluster to produce an intermediate result (i.e, "map" step) and the intermediate results are then redistributed by key and consolidated according to a given function (i.e., "reduce").

System 200 includes inference engine 220, which may be executed on one or more nodes of cluster 120. Inference engine 220 may be configured to ingest and process documents into an RDF representation. For example, inference engine 220 includes ingestion tier 222 for receiving and/or retrieving documents (e.g., intelligence reports, emails, etc.), document-based resolution tier 224 for identifying clusters of semantically relevant documents, entity-based resolution tier 226 for inferring additional relationships based on entity relationships, and domain-based resolution tier 228 for inferring additional relationships based on domain-specific knowledge, such as by applying expert systems. By layering the components of inference engine 220 into tiers 222-228 that first cluster semantically similar documents before inferring relationships, the system is able to handle large volumes of data (e.g., petabytes or greater) without becoming too brittle.

System 200 includes a data access layer 230 for storing semantic data, ingested documents, intermediate data (e.g., data produced during inference activities), and/or other types of data. For example, the tiers of inference engine 230 may communicate input and output data via data access layer 230.

In various embodiments, data access layer 230 may be implemented by storage devices associated with and/or coupled to cluster 120. For example, the storage provided by data access layer 230 may be provided in whole or in part by the individual hard drives or solid-state storage of the computers in the cluster, by a separate storage cluster, by cloud storage, and/or by any special-purpose storage devices, such as tape backup, large-scale magnetic storage, large-scale solid state storage, etc.

In some embodiments, data access layer 230 may implement a distributed file system, such as a Hadoop Distributed File System (HDFS), which may facilitate fast access to semantic database. In some embodiments, the semantic database stored in data access layer 230 may be a managed database, including a query engine for facilitating query of and access to the semantic data. The semantic database may be implemented as files on the distributed file system.

Figure 3:
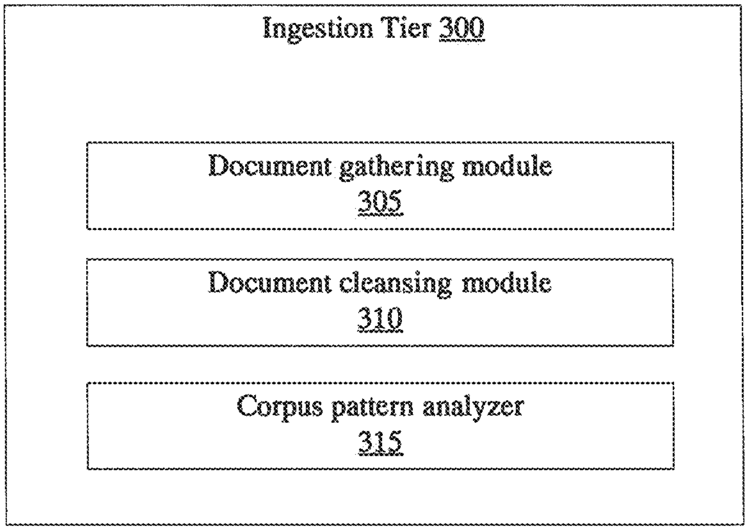
FIG. 3 is a block diagram illustrating components of an ingestion tier of an inference engine, according to some embodiments of the present invention.

FIG. 3 is a block diagram illustrating components of an ingestion tier of an inference engine, such as ingestion tier 222 of inference engine 220, according to some embodiments of the present invention. Ingestion tier 300 may correspond to any combination of software and/or hardware configured to acquire documents for the corpus and ingest those documents into the semantic database.

According to the illustrated embodiment, ingestion tier 300 includes a document gathering module 305. Document gathering module 305 may be configured to receive documents in any format, such as natural language or a structured format (e.g., XML.

In some instances, the document gathering module 305 may be configured to actively search for and pull documents from remote sources, such as by crawling the web or searching through an email database, a company file system, a backup storage facility and/or any other type of document repository for ingestible documents. For example, the document gathering module may be configured to periodically scan an email repository for new intelligence reports and to ingest those reports into the semantic database.

In other instances, the document gathering module 305 may be configured to passively receive documents from another component though a programmatic interface. The interface may be invoked by one or more other components to add documents to the semantic database. For example, the document gathering module 305 may expose an interface for ingesting email messages and an email system may be configured to invoke the interface each time an email message is received.

Ingestion tier 300 further includes a document cleansing module 310, which may be configured to normalize document content. In various embodiments, the cleansing module 310 may strip extra white space, extraneous formatting, and/or other superfluous data from a document being ingested. For example, if document gathering module 305 ingests a document encoded in HTML and another in Word™ format, the document cleansing module 310 may normalize the two documents to use a common encoding without extraneous formatting or other metadata. The particular normalized formatting may depend on the particular implementation.

Ingestion tier 300 also includes a corpus pattern analyzer (CPA 315) for extracting entities and relationships from ingested documents. The CPA may employ complex natural language processing techniques to identify entities described in each document and to determine semantic relationships between those entities.

The extracted entities may correspond to any real-world entities, such as people, places, companies, organizations, and the like. The extracted relationships may correspond to any semantic relationship between two or more of the entities. For example, suppose the ingested document is a memorandum reporting that Steve, who is a banker at UBC, was seen meeting with Terry at the Blue Parrot Inn. The CPA may extract the entities "Steve," "UBC," "Terry," and "Blue Parrot Inn" from the memorandum. The CPA may then identify relationships between the entities. For example, the CPA may create a unidirectional "works at" relationship between Steve and UBC, a bidirectional "met with" relationship between Steve and Terry, and respective unidirectional "met at" relationship between Steve and the Blue Parrot Inn and/or with Terry and the Blue Parrot Inn. In some embodiments, some relationships may be denoted as attributes of entities or relationships (e.g., the "met with" relationship between Steve and Terry may be decorated by the attribute "place="blue parrot inn.").

CPA 315 may be configured to create a structured representation of the extracted entities and relations. The structured representation may include indications of the ingested documents, particular sentences within the ingested documents, metadata for the documents, and/or the extracted entities and relationships. The structured representation may be stored in the data access layer (e.g., data access layer 230) and thus passed to the document-based resolution tier for further processing.

Figure 4:
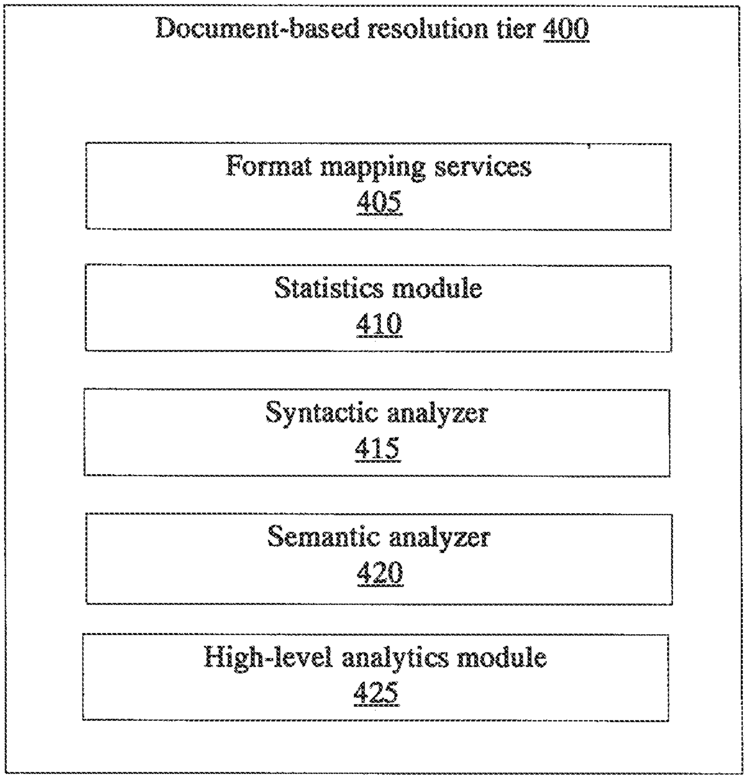
FIG. 4 is a block diagram illustrating components of a document-based resolution tier ("document tier") of an inference engine, according to some embodiments of the present invention.

FIG. 4 is a block diagram illustrating components of a document-based resolution tier ("document tier") of an inference engine, such as document-based resolution tier 224 of inference engine 220, according to some embodiments of the present invention. Document tier 4(X) may be implemented by any combination of software and/or hardware configured to cluster ingested documents into semantically related groups.

According to the illustrated embodiment, document tier 400 includes format mapping services (FMS) 405. FMS 405 may be configured to convert the structured representation output by the ingestion tier into RDF data and to normalize that data for analysis by the semantic inference and reasoning engine. For example, in a MapReduce-based implementation, the FMS may read the structured representation output by the ingestion tier and convert it to RDF. Next, the FMS may then normalize the RDF by repackaging it for MapReduce (e.g., by creating a sequence file of n-tuples) and optimizing the representation by disambiguating key values.

Document tier 400 includes statistics module 410, which may be configured to gather statistics about the ingested documents and thereby make meta-inferences. For example, statistics module 410 may be configured to count the number of entities and/or relationships defined in each ingested document in order to determine their relative importance to the corpus. A document concerning many entities and relationships may be more important to the corpus than one that concerns very few. Accordingly, more important documents may warrant extra processing, grouping into multiple groups, and/or other unique treatment.

Document tier 400 also includes syntactic analyzer 415 and semantic analyzer 420. Analyzers 415 and 420 may be configured to determine semantically-related clusters of documents based on the entity/relationship data previously identified. Documents that appear to be highly semantically interrelated may be grouped together as a single cluster. For example, if the ingested documents include emails and other documents concerning three different events planned by a wedding planning company, the syntactic and semantic analyzers 415 and 420 may group the documents (based on their entities and relationships) into three groups: one for each event. The semantic analyzer 420 and syntactic analyzer 415 may be executed sequentially or in parallel.

Syntactic analyzer 415 may be configured to identify related documents based on the particular text of the documents. For example, if syntactic analyzer 415 discovers that a group of documents contain some number of sentences or phrases in common, the analyzer may conclude that the documents are syntactically related to one another, and therefore, likely semantically related. By further analyzing metadata (e.g., date of document creation), the syntactic analyzer may identify the nature of particular relationships between the documents (e.g., a sentence was copied from an earlier document to a subsequently created document).

Semantic analyzer 420 may be configured to identify related documents based on the particular entities and semantic relationships represented in the document. For example, if semantic analyzer 420 discovers that the entities and/or relationships mentioned in a group of documents overlap significantly, the semantic analyzer 420 may conclude that those documents are semantically related. In various embodiments, the semantic analyzer may employ various data mining and/or machine learning techniques, such as named entity recognition and/or linguistic extraction.

Document tier 400 also includes high-level analytics module 425, which may be configured to analyze each cluster of documents to produce cluster-level metadata. Analytics module 425 may analyze a cluster to determine various metadata, such as the number of entities and/or relationships within the cluster, number of documents within the cluster, level of entity interconnectedness within a cluster, the most important entities/relationships within the cluster, and/or various other cluster-level metadata. The cluster-level metadata may be used for analysis by subsequent tiers and/or for query and visualization of query results.

Figure 5:
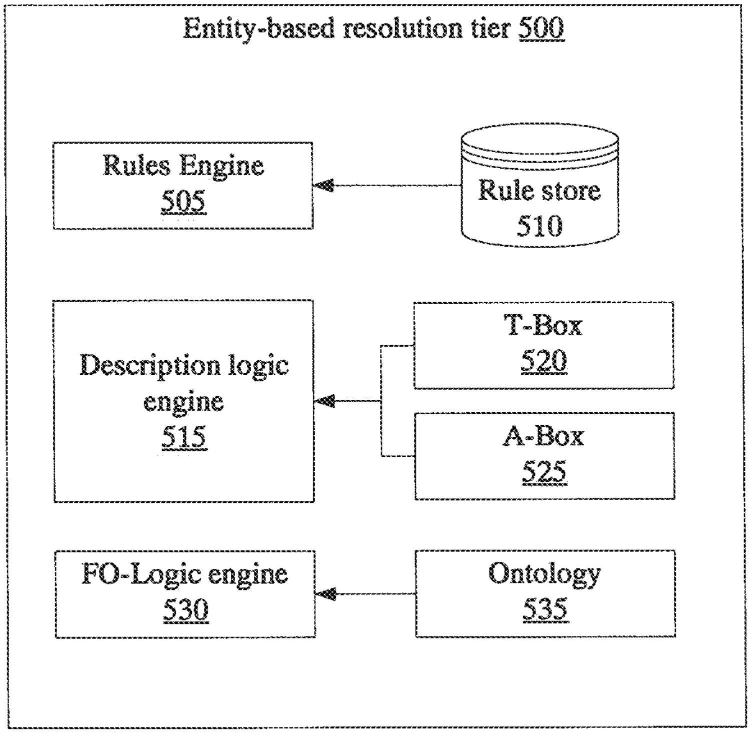
FIG. 5 is a block diagram illustrating components of an entity-based resolution tier ("entity-tier") of an inference engine, according to some embodiments of the present invention.

FIG. 5 is a block diagram illustrating components of an entity-based resolution tier ("entity-tier" 500) of an inference engine, such as entity-based resolution tier 226 of inference engine 220, according to some embodiments of the present invention. Entity tier 500 may be implemented by any combination of software and/or hardware configured to infer new semantic relationships from existing semantic relationships based on domain-independent logic.

Entity tier 500 may be applied to each cluster of documents separately. By limiting the inference activity to a single group of semantically related documents at a time, the technique enables the system to manage data size and framing problems described above.

According to the embodiment of FIG. 5, entity tier 500 may comprise an ecosystem of different, domain-independent inference components, each configured to infer new semantic relationships between entities in a cluster based on the existing semantic relationships. The ecosystem may comprise various inference engines known in the art, such as rules engines, description logic engines, and/or First Order logic (FO-logic) engines. For example, in the illustrated embodiment, entity tier 500 includes a rules engine 505, which applies a rules based system described in rule store 510 (e.g., a rules database). Entity tier 500 further includes a description logic engine 515, which is based on T-Box reasoning 520 and A-Box reasoning 525. Entity tier 500 further includes an FO-logic engine 530 based on ontology 535. In various embodiments, entity tier 500 may include fewer and/or additional types of domain-independent inference algorithms, such as forward chaining techniques, backward chaining techniques, Bayesian reasoning, and/or others.

In some embodiments, the entity tier 500 may employ the various inference engines (e.g., 505, 515, 530), each according to respective tuning parameters. Such parameters may be set in one or more configuration files, which may be read by the system at runtime.

In various embodiments, entity tier 500 may employ the inference engines in any order (i.e., according to any static or dynamic schedule), including sequentially, in parallel, and/or iteratively. A "static" schedule may refer to a schedule in which the individual inference engines are applied in a predefined order. A "dynamic" schedule may refer to a schedule where the decision of which inference engine to apply next is made based on runtime conditions, such as the results of one or more previous inference engine executions.

Figure 6:
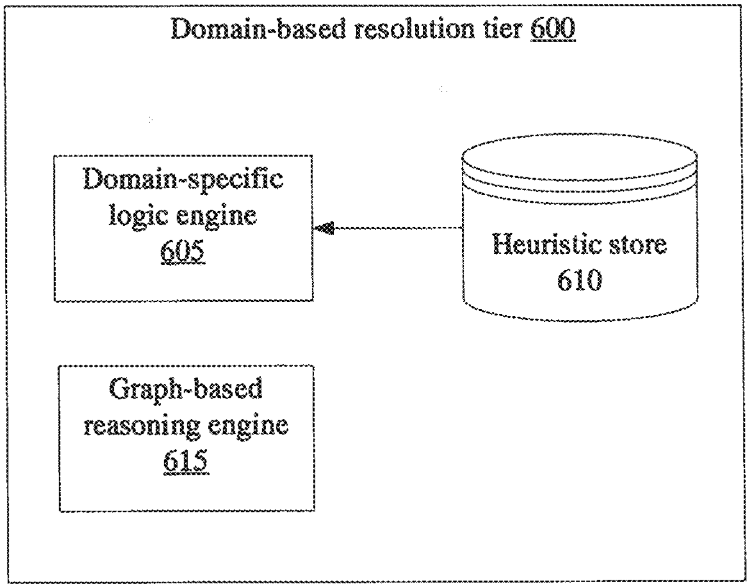
FIG. 6 is a block diagram illustrating components of a domain-based resolution tier ("domain tier") of an inference engine, according to some embodiments of the present invention.

FIG. 6 is a block diagram illustrating components of a domain-based resolution tier ("domain tier" 600) of an inference engine, such as domain-based resolution tier 228 of inference engine 220, according to some embodiments of the present invention. Domain tier 600 may be implemented by any combination of software configured to infer new semantic relationships from existing semantic relationships based on domain-dependent logic.

Like entity tier 500, domain tier 600 may be applied to each cluster of documents separately. Accordingly, by limiting the inference activity to a single group of semantically related documents at a time, the technique enables the system to manage data size and framing problems described above.

According to the embodiment of FIG. 6, domain tier 600 may comprise an ecosystem of different, domain-specific inference components, each configured to infer new semantic relationships between entities in a cluster based on the existing semantic relationships. Like entity tier 500, the ecosystem of reasoners in domain tier 600 may comprise various reasoners known in the art, such as domain-specific logic engines (e.g., expert systems) and/or graph-based reasoning engines. For example, in the illustrated embodiment, domain tier 600 includes domain-specific logic engine 605, which is configured to infer new relationships based on heuristics in heuristic store 610 (e.g., database, configuration file(s), etc.). Such a domain-specific logic engine may correspond to an "expert system" configured to deduce new relationships based on domain-specific rules (e.g., if Steve is an employee of company C and Steve has been spotted entering building B every weekday at 8 am and leaving a 5 pm, then company C has an office in building B). The particular heuristics in heuristic store 610 may be domain-specific and determined by domain experts. Domain tier 600 also includes graph-based reasoning engine 615, which may be configured to infer new relationships based on probabilistic graph matching techniques, such as sub-graph isomorphism matching to determine if two differently organized graphs are indeed referring to the same real world entity.

As with the entity tier 500, the domain tier 600 may apply its inference engines according to different input parameters and in any order, including sequentially, in parallel, and/or iteratively. Such an order may be static (e.g., according to a predefined script) and/or dynamic (iterative based on the results of previous inferences). For example, a dynamic schedule my choose which one or more inference engines (if any) to execute next based on the results of previous inference engine runs (e.g., do not rerun an inference engine if no new relationships have been inferred since the previous time the engine was run).

In various embodiments, the inference activities of entity tier 500 and domain tier 600, including the particular inference engines within each tier, may be executed in any order (e.g., parallel, sequential, iterative) and according to any static or dynamic schedule. Runtime parameters and the static or dynamic schedule may be set by the system administrator using one or more system configuration files.

Figure 7:
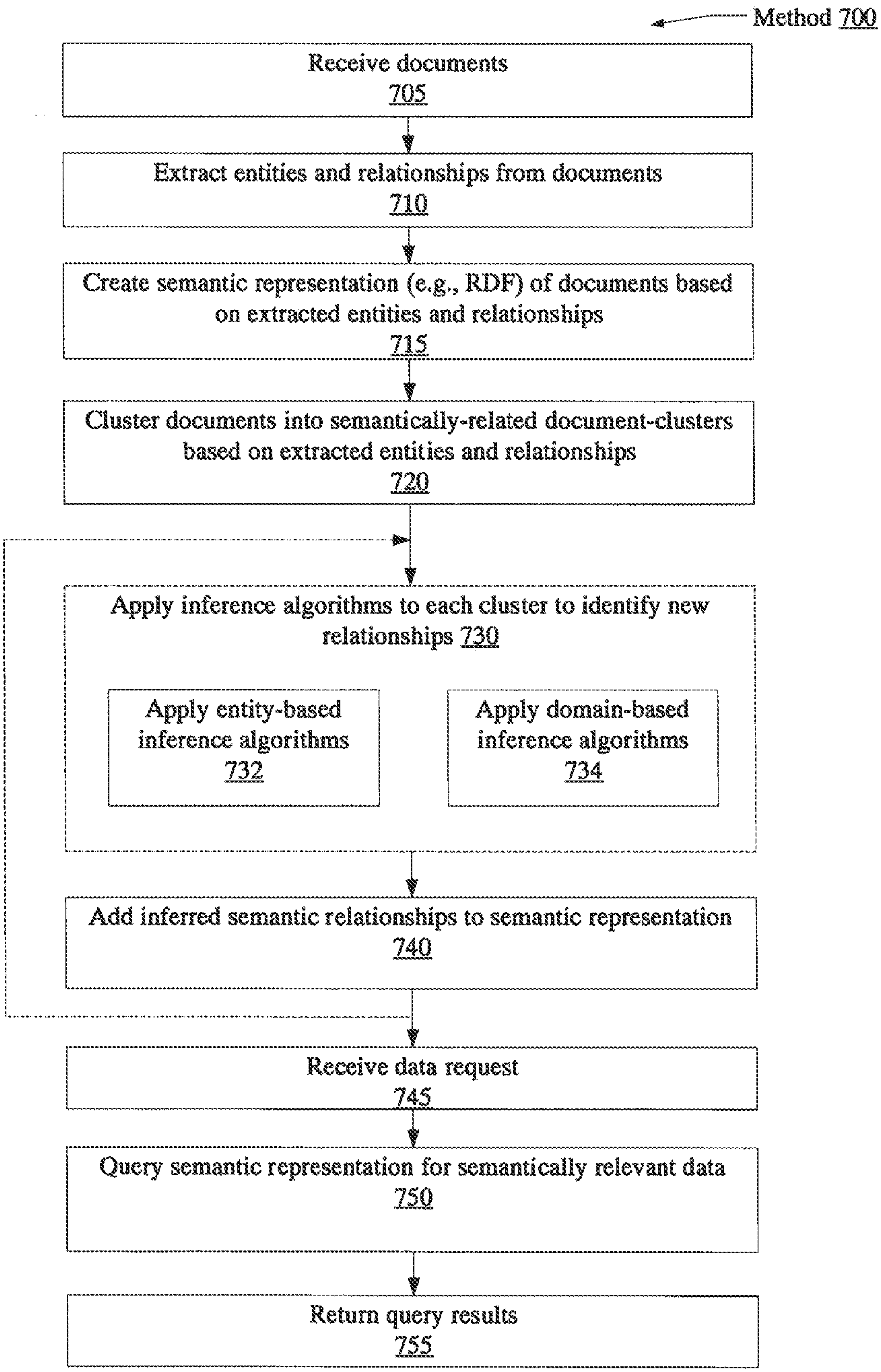
FIG. 7 is a flow diagram illustrating a method for analyzing a corpus of documents using a semantic inference and reasoning engine, according to some embodiments of the present invention.

FIG. 7 is a flow diagram illustrating a method for analyzing a corpus of documents using a semantic inference and reasoning engine, according to some embodiments of the present invention. In some embodiments, method 700 may be executed by the hardware of system 100 (FIG. 1), some of which may be executing the logical components of system 200 (FIG. 2).

According to the illustrated embodiment, method 700 first receives documents, as in 705. As discussed above, the receiving of 705 may be performed by active retrieval (e.g., crawling a document repository) and/or by passive receiving (e.g., receiving email reports).

Method 700 next comprises extracting entities and relationships from the received documents, as in 710. As described above, the ingestion tier may receive the documents and extract entities and relationships into a structured representation using CPA.

Method 700 next comprises creating a semantic representation (e.g., RDF) of the ingested documents based on the extracted entities and relationships, as in 715. As described above, the document tier may create the RDF and ensure that it is normalized for use with the execution framework (e.g., MapReduce).

In 720, the documents are clustered into semantically-related document clusters based on the extracted entities and relationships. The clustering step of 720 may be executed by the document tier (e.g., 400), as described above.

In 730, a variety of inference algorithms are applied to each cluster to infer new relationships between the entities in the cluster based on the existing relationships. The inference step of 730 may comprise applying entity-based inference algorithms (as in 732) and/or domain-based inference algorithms (as in 734) to infer new relationships. The entity-based and domain-based algorithms may be executed by entity tier 500 and/or by domain tier 600 according to any execution parameters and/or in any order (e.g., according to a static and/or dynamic schedule). As discussed above, the parameters and/or schedules may be specified by the system administrator in configuration files. Thus, an administrator may use configuration files may specify which inference engines to use, the static and/or dynamic workflow for those engines, and the parameters for those engines.

In some embodiments, the configuration parameters for each inference engine may be provided in a manner corresponding to a static schedule. For example, the parameters for the inference engines in a static schedule may be provided as a vector, where the $i^{th}$ element in the vector corresponds to a set of parameters for the $i^{th}$ inference engine in the static schedule. Components scheduled to be executed in parallel may be sorted by secondary criteria, such as lexicographically by engine name. In some embodiments, a pre-tested schedule and set of configuration parameters may be provided. However, because the optimal configuration parameters and schedules may vary with domain or deployment, users may modify the configuration parameters and/or schedule to suit particular data sets or deployments.

In 740, the new relationships inferred in 730 may be added to the RDF representation created in 715. Thus, the entity relationships indicated in the RDF database may become richer each time an inference algorithm is applied in 730. Because, new relationships may be added in 740, the method may comprise iteratively executing the inference algorithms of 730 according to a static and/or dynamic schedule, as indicated by the feedback loop from 740 to 730.

Once the inference components have finished inferring and adding new relationships to the RDF, the RDF database is ready to be queried. In some embodiments, the ingestion and inference steps (e.g., 705-740) may be executed regularly as a background process. Thus, documents may be regularly ingested and incorporated into the RDF database. In some embodiments, the execution may be structured as a MapReduce execution and may be controlled by the MapReduce scheduling software, such as scheduler 201 of FIG. 2. In addition to the ingestion and inference steps of 705-740, the system may be configured to optimize the RDF database for query, such as by creating various indices around entities, relationships, documents, etc.

In 745, the system receives a data request. The data request may come from a client (e.g., clients 105 of FIG. 1) and be received by a web server interface, such as by server 205 of FIG. 1. In some embodiments, the data request may come from one of the servers (e.g., 205) in response to a client request and be received by a query engine coupled with the semantic database. For example, a server 205 may be configured to respond to client requests for data by formulating a query in a structured query language (e.g., SPARQL, a structured query language for RDF). In various embodiments, different semantic representations and query languages may be used. For example, in other embodiments, this aspect of the invention ay be implemented by a NoSQL query and database.

The data request of 745 may specify one or more entities, relationships, documents, and/or any other items in the RDF. For example, the request may be for all documents relevant to a given person. In another example, the request of 745 may be for all entities with a given relationship (e.g., "resides in") to a particular another entity (e.g., "Chicago").

In response to receiving the data request, the system queries the semantic database (i.e., semantic representation) for semantically relevant data, as in 750. Because the semantic database includes both semantic relationships that were indicated by the ingested document and those that were inferred from those documents, the query may be satisfied by both indicated and/or inferred relationships.

In 755, the results of the query are returned. The returned results may depend on the document clustering performed in 720. For example, results may be visualized and/or otherwise presented according to the document clusters. Examples of such visualizations are shown in FIG. 12.

FIGS. 8-11 illustrate different portions of method 700 in more detail, according to some embodiments of the present invention. Each portion may be executed by a corresponding tier of the semantic inference and reasoning engine.

Figure 8:
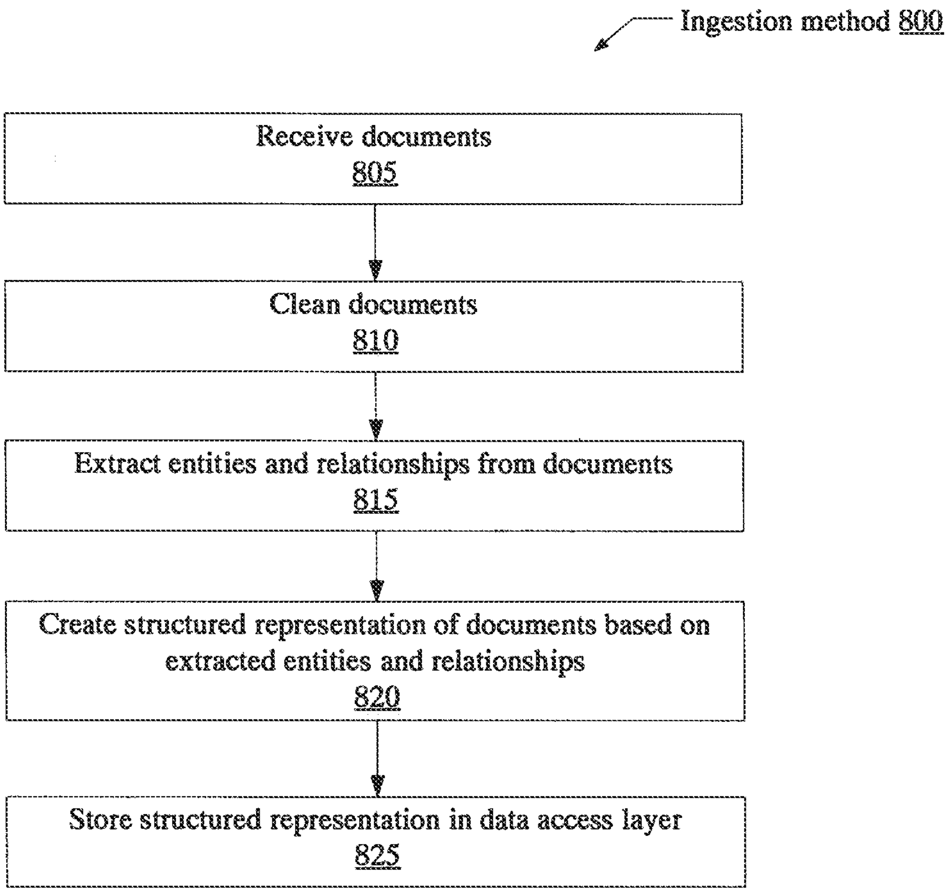
FIG. 8 is a flow diagram illustrating a method for ingesting documents into the semantic database, according to some embodiments of the present invention.

FIG. 8 is a flow diagram illustrating a method for ingesting documents into the semantic database, according to some embodiments of the present invention. Method 800 of FIG. 8 may be executed by an ingestion tier, such as 222 or 300.

Method 800 begins in 805 by receiving documents to be ingested. As described above, the receiving may be performed as an active retrieving step (e.g., crawling a document repository) or a passive step (e.g., receiving a document via an invocation of an exposed ingest interface). The received documents may be in natural language, text, structured language, and/or in any other format.

In 810, the documents are cleaned. As described above, the cleaning may involve stripping formatting, stripping extraneous characters and/or spaces, converting one encoding to another, etc.

In 815, entities and relationships are extracted from the documents. As described above, the entities and relationships may be extracted by the ingestion tier using CFA techniques and/or other natural language processing. The extracted entities and relationships may include syntactic structures, such as sentences.

In 820, a structured representation of the documents, entities, relationships, entities, etc., is created. The structured representation may be annotated with various attributes and/or metadata. For example, a document may be annotated with various document metadata, such as word counts, date of creation, file name, author, and so forth.

In 825, the structured representation is stored in the data access layer. Thus, a result of the ingestion method 800 is a structured representation of the ingested documents, including content and metadata.

In some embodiments, the ingestion method may ingest structured data (e.g., in RDF) directly, which may obviate many of the steps described in FIG. 8 for such documents. In such an example, a document ingested in RDF may be directly passed to the data access layer for processing by subsequent tiers. Documents ingested directly in RDF may include schemas and/or ontologies that may also be ingested to enable more in-depth processing by subsequent analysis tiers.

Figure 9:
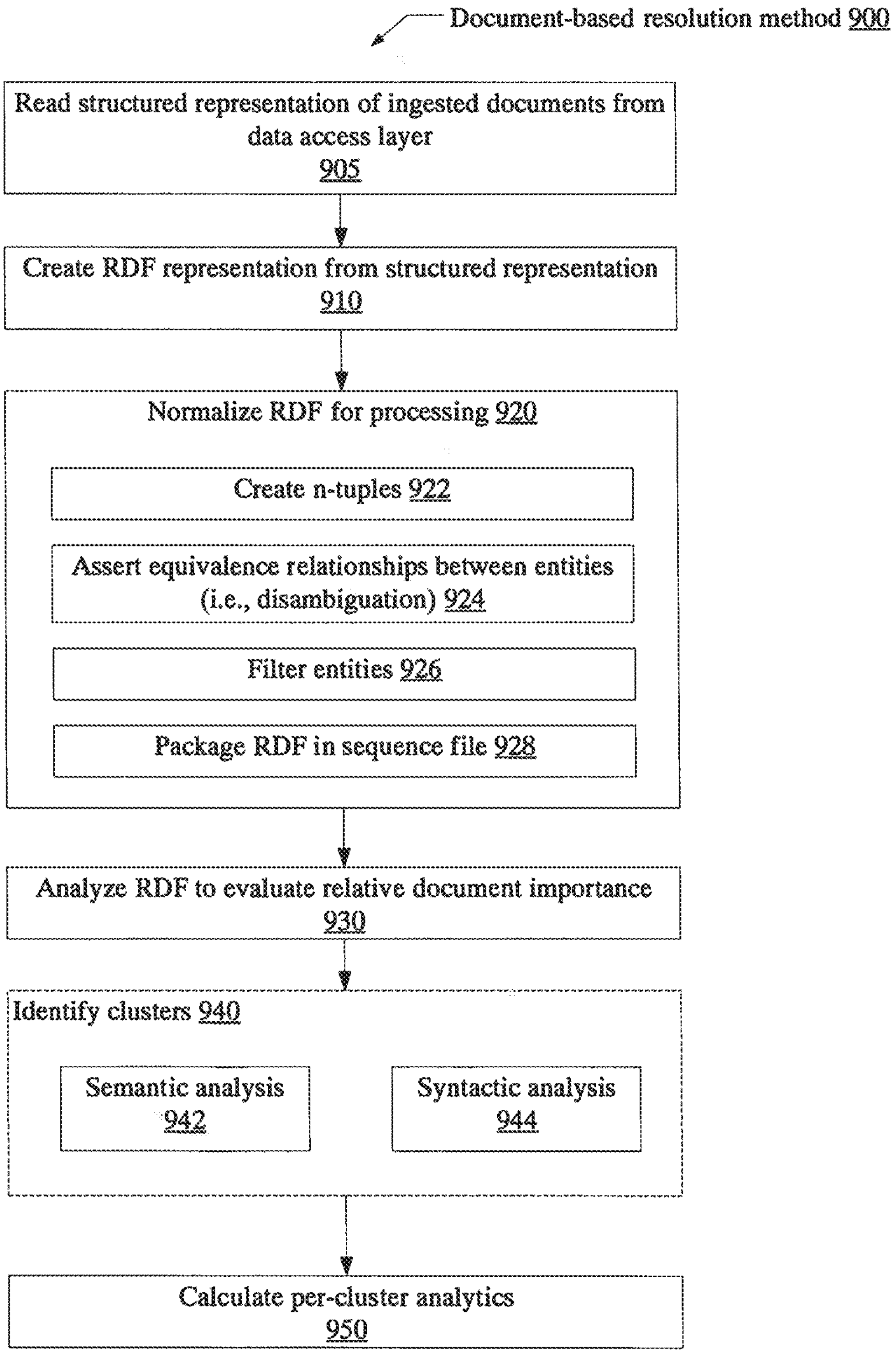
FIG. 9 is a flow diagram illustrating a method for clustering documents using document-based resolution, according to some embodiments of the present invention.

FIG. 9 is a flow diagram illustrating a method for clustering documents using document-based resolution, according to some embodiments of the present invention. Method 900 of FIG. 9 may be executed by a document-based resolution tier, such as 224 and 400.

Method 900 begins in 905 where the document tier accesses the data access layer to read the structured representation created by the ingestion tier. In 910, the document tier converts the structured representation to RDF. In other embodiments, the system may use a semantic language other than RDF.

In 920, the RDF is normalized for processing. Normalization 920 may entail manipulating the RDF into a format that can be used by the processing framework (e.g., MapReduce) to identify clusters and/or infer new semantic relationships. For example, in the illustrated embodiment, the RDF is normalized for execution in a MapReduce framework. Accordingly, the method of normalizing may include steps such as creating n-tuples representing the data (as in 922), disambiguating entities by asserting equivalence relationships between entities in the RDF such that two textual names for the same entity are consolidated into one (as in 924), filtering the entities to remove sentences that are known to be non-indicative of semantic relationships (e.g., headers, footers, boilerplate language, other jargon, etc.) (as in 926), and packaging the RDF into a sequence file (as in 928), which is a format that can be input into a MapReduce program. The particular steps of normalizing the RDF for processing may vary when other types of computational frameworks are used.

In 930, the RDF is analyzed to evaluate relative document importance. The results of step 930 may be used in subsequent steps to direct analysis to particularly important documents.

In 940, clusters are identified via semantic analysis (e.g., 942) and/or syntactic analysis (e.g., 944). For example, a document tier such as 400 may utilize semantic analyzer 420 to group entities and/or documents based on the semantic relationships in the RDF. The same document tier may utilize syntactic analyzer 415 to group entities and/or documents based on the syntactic (e.g., sentence overlap) relationships between documents in the RDF.

In various embodiments, the semantic analysis 942 and syntactic analysis 944 may be performed sequentially, in parallel, and/or iteratively. For example, each type of analysis may be implemented by a MapReduce program and executed on a compute cluster, such as cluster 120. The particular workflow used to create the grouping may be parameterized (e.g., using a configuration file). Thus, an administrator may be able to tweak the method of identifying clusters for different domains and/or datasets.

In 950, each cluster is analyzed to calculate per-cluster analytics. As described above, the analytics may identify important entities, relationships, and/or documents. In some embodiments, the analytics may provide summaries of the cluster and/or the documents within the cluster. Such summaries may be presented to a user to facilitate speedy understanding of the cluster and its elements. As with any of the analysis steps, the per-cluster analytics may be calculated in parallel, such as by a MapReduce program.

A result of document-based resolution method 900 is a semantic database (e.g., in RDF) where documents have been grouped into semantically relevant clusters. As shown in method 900, the grouping may comprise converting the ingested documents to analyzable RDF and analyzing the RDF through parallel execution (e.g., using MapReduce programs).

Figure 10:
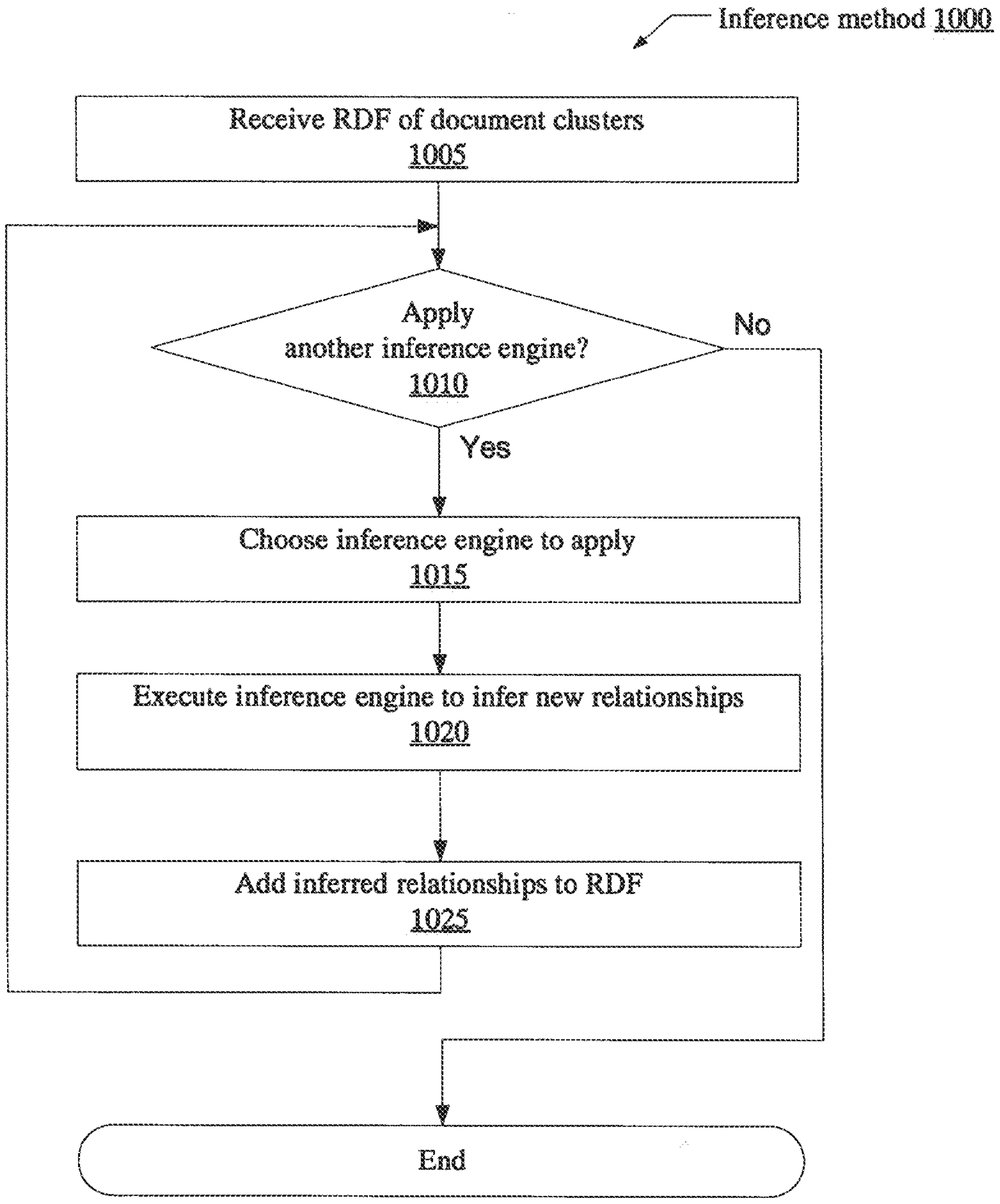
FIG. 10 is a flow diagram for inferring new relationships in RDF data, according to some embodiments of the present invention.

FIG. 10 is a flow diagram for inferring new relationships in RDF data, according to some embodiments of the present invention. Method 1000 of FIG. 10 may be executed by an entity-based resolution tier (e.g., 226 or 500) and/or by a domain-based resolution tier (e.g., 228 or 600). As with the other analyses, the inference process may be implemented through parallel execution, such as by using any number of MapReduce programs executing on a compute cluster, such as 120. Furthermore, the particular workflow of individual inference engines, as well as the individual inference engines, may be calibrated by a system administrator in one or more configuration files.

According to the illustrated embodiment, method 1000 begins by receiving the RDF of document clusters, as in 1005. The RDF may be retrieved from the data access layer, where it was stored by the document tier.

In 1010, the system decides whether it should apply another inference algorithm in an attempt to infer new relationships in the RDF. The decision may be informed by a static or dynamic schedule, which may be specified in the one or more configuration files. As described above, a static schedule may dictate a particular workflow of inference engines and/or an order in which they are applied. A dynamic schedule may provide parameters for deciding which inference engine to apply next and/or the runtime parameters of those inference engines. Such decisions may be based on which inference engines were executed previously and what inferences those previous executions added. For example, if no new inferences have been added since the previous execution of a given inference engine, then it may not be productive to re-execute the same inference engine with the same parameters.

If the system determines that another inference engine should be applied, as indicated by the affirmative exit from 1010, then the system chooses which inference engine to apply (as in 1015) and executes that inference engine to generate new relationships (as in 1020).

As described above, the choice of which inference engine(s) to apply next and/or what parameters to use for each engine, may be a product of a static or dynamic schedule defined by the system configuration. By providing customizable configuration, administrators may fine tune the system for particular domains. In some instances, the system may decide to execute multiple inference engines in parallel.

As described above, the particular inference engines to be applied may be domain-independent (e.g., entity-based) and/or domain dependent. Various examples of such inference engines were described above with relation to FIGS. 5 and 6.

Once a chosen inference engine has executed, the inferred relationships are added to the RDF in 1025. Although the relationship addition step of 1025 is illustrated separately from execution step 1020, it should be understood that, in various embodiments, the relationships may be added to the RDF as part of execution step 1020.

Inferred relationships may correspond to those that were not explicit in the ingested documents, but which, nevertheless, could be inferred from the ingested documents. For example, if an ingested document includes the sentence "Steve works in Chicago", the semantic "works in" relationship between the entities "Steve" and "Chicago" is said to be "explicit." Explicit relationships may be identified and incorporated into the RDF without an inference engine. However, if a group of ingested documents indicate that "Terry" has been in an office building in Chicago every weekday from morning and until early evening, but not on weekends or nights, an inference engine (e.g., an expert system) may be able to infer that Terry works in Chicago. Accordingly, the inference engine may create an inferred "works in" relationship between the entity "Terry" and the entity "Chicago." Such relationships are said to be "inferred."

After the newly inferred relationships have been added (as in 1025), the method loops back to the decision of whether to apply another inference engine, as in 1010. When no more inference engines are to be applied, as indicated by the negative exit from 1010, inference method 1000 ends.

A result of inference method 1000 is that the RDF database includes some number of inferred relationships in addition to the explicit ones. Queries to the RDF may therefore rely on explicit and inferred relationships to provide richer, more relevant results and deeper analysis than typical keyword searches.

In some embodiments, the ingestion, clustering, and inference methods (e.g., 800, 900, 1000) may be executed periodically to maintain the semantic database. For example, the method may be executed on SIRE compute cluster 120 nightly or on some other schedule. In some embodiments, a system administrator may initiate processing of the semantic database (i.e., ingestion, clustering, and/or inference) on demand.

Figure 11:
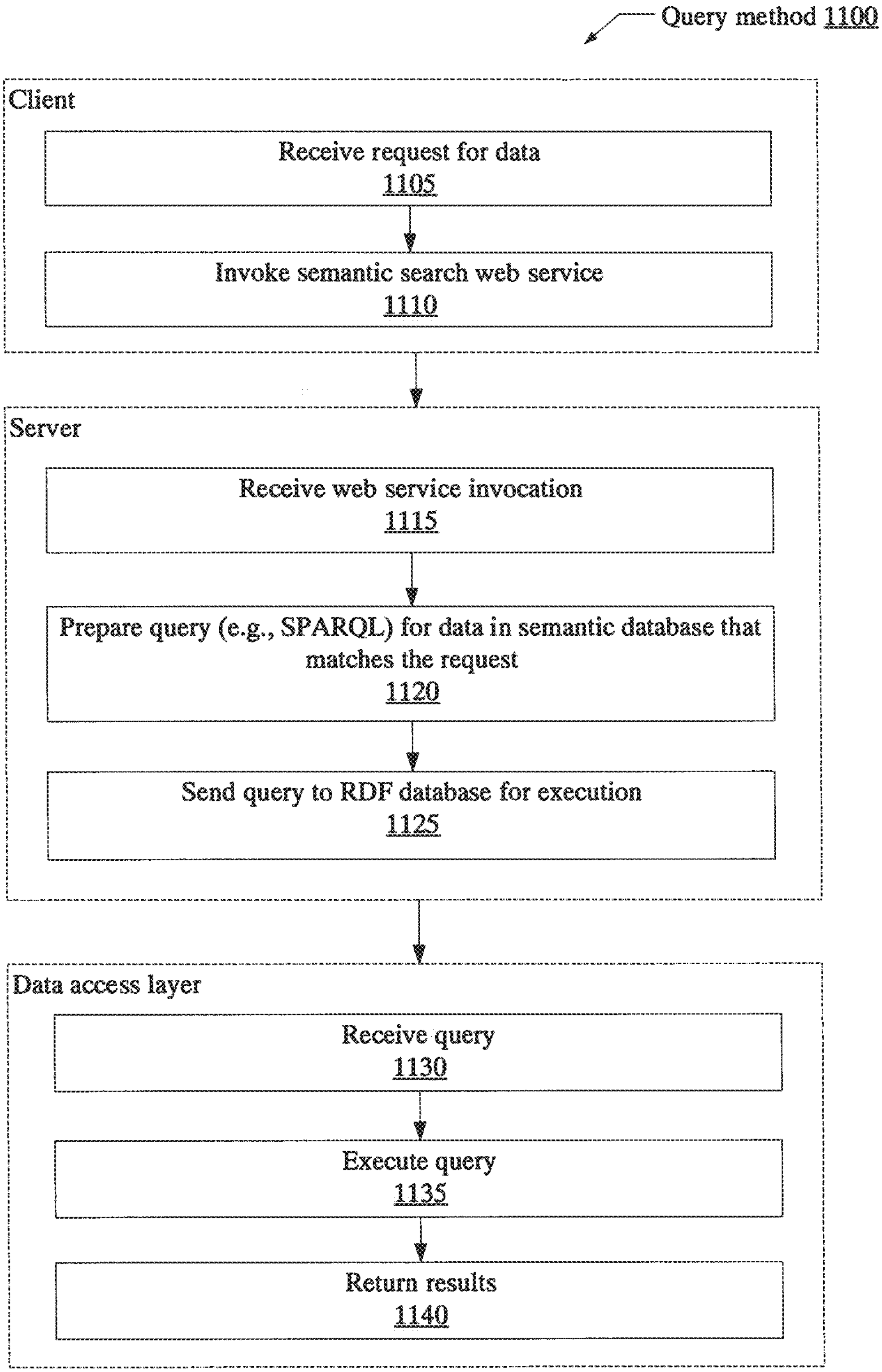
FIG. 11 is a flow diagram illustrating a method for querying a semantic database, according to some embodiments of the present invention.

FIG. 11 is a flow diagram illustrating a method for querying a semantic database, according to some embodiments of the present invention. As indicated by the dotted boxes, different portions of query method 1100 may be executed by different client-side and/or server-side components.

According to the illustrated embodiment, query method 1100 begins with the client (e.g., 105) receiving a request for data, as in 1105. For example, the request may be to search for all ingested documents that are relevant to a particular person.

The request may be specified by a user using a graphical user interface. The graphical user interface may be provided as part of a web application (e.g., via a browser), as part of a stand-alone application, or through some other means.

In response to receiving the request for data in 1105, the client may invoke a semantic search web service, as in 1110.

In 1115, a server (e.g., web server 205) receives the web service invocation sent by the client in 1110. According to the illustrated embodiment, the server prepares a query for data in the semantic database that matches the search request, as in 1120. The query may be articulated in a structured query language, such as SPARQL (an RDF query language). The query is then sent to a data access layer (e.g., 230) for execution, as in 1125.

In 1130, the data access layer receives the query and executes it in 1135. The data access layer then returns the results to the server in 1140. The server may subsequently return the results to the client.

In various embodiments, query execution in 1135 may be handled by a query execution engine. The results obtained from the semantic database may be further processed at any point in the chain of return, from the data access layer, to the server, the client. Such processing may be necessary to repackage the results in a format acceptable to the recipient.

Figure 12A:
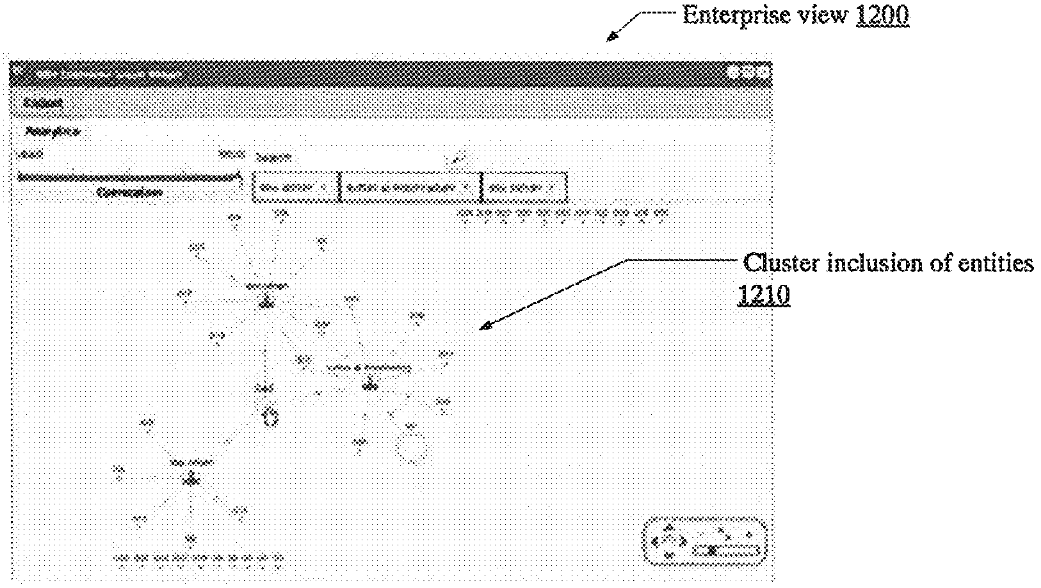
FIG. 12*a* illustrates a visualization of document clusters related to queried entities, according to some embodiments of the present invention.
Figure 12B:
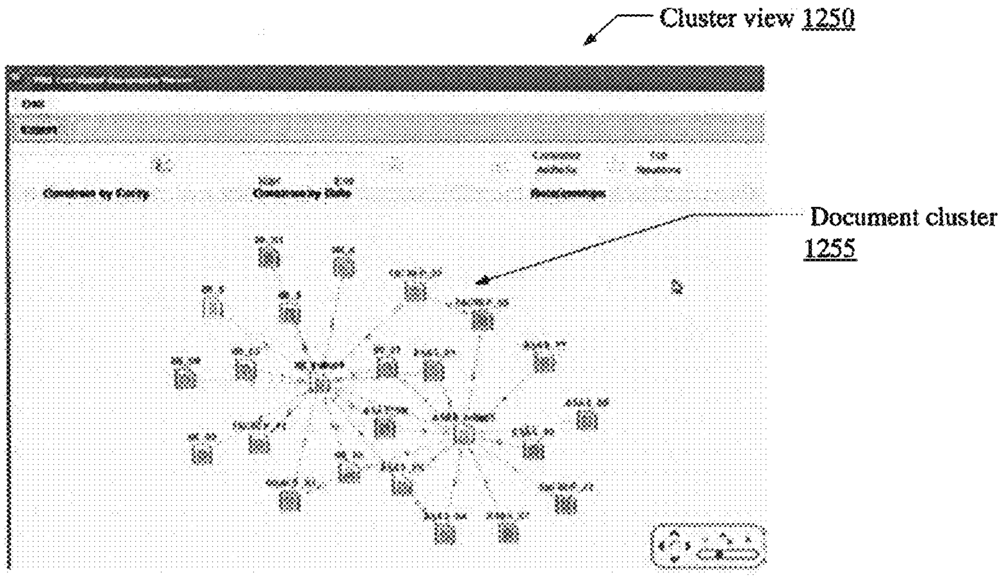
FIG. 12*b* illustrates a visualization of a single document cluster, according to some embodiments of the present invention.

In response to receiving the results of the data request, software executing on the client may visualize the results and/or otherwise present the results. FIG. 12*a* and FIG. 12*b* illustrate two example visualizations that client software may be configured to present to a user in response to a query.

FIG. 12*a* illustrates a visualization of document clusters related to queried entities, according to some embodiments of the present invention. Enterprise view 1200 visualizes entities in various clusters (i.e., cluster inclusion of entities 1210). Cluster inclusions 1210 show that three entities have been queried and that each is related to a respective set of document clusters. Visualization 1210 shows that all three entities are semantically related to at least one cluster of documents and that two of the entities are both semantically related to a set of three document clusters. Semantic relations are indicated by edges between nodes of the graph. Edges may be annotated to denote the character, strength, or other characteristic of the relationship.

FIG. 12*b* illustrates a visualization of a single document cluster, according to some embodiments of the present invention. Cluster view 1250 visualizes document cluster 1255, including the individual documents in the cluster and their interrelationships. As in enterprise view 1200, edges may be used to represent relationships and may be annotated to denote the nature (e.g., strength) of those relationships.

In various embodiments, other types of visualization maybe possible. Co-pending U.S. application Ser. No. 13/097,662 provides various other examples of querying, retrieving, and visualizing semantic data. The contents of application Ser. No. 13/097,662 are incorporated herein by reference.

Figure 13:
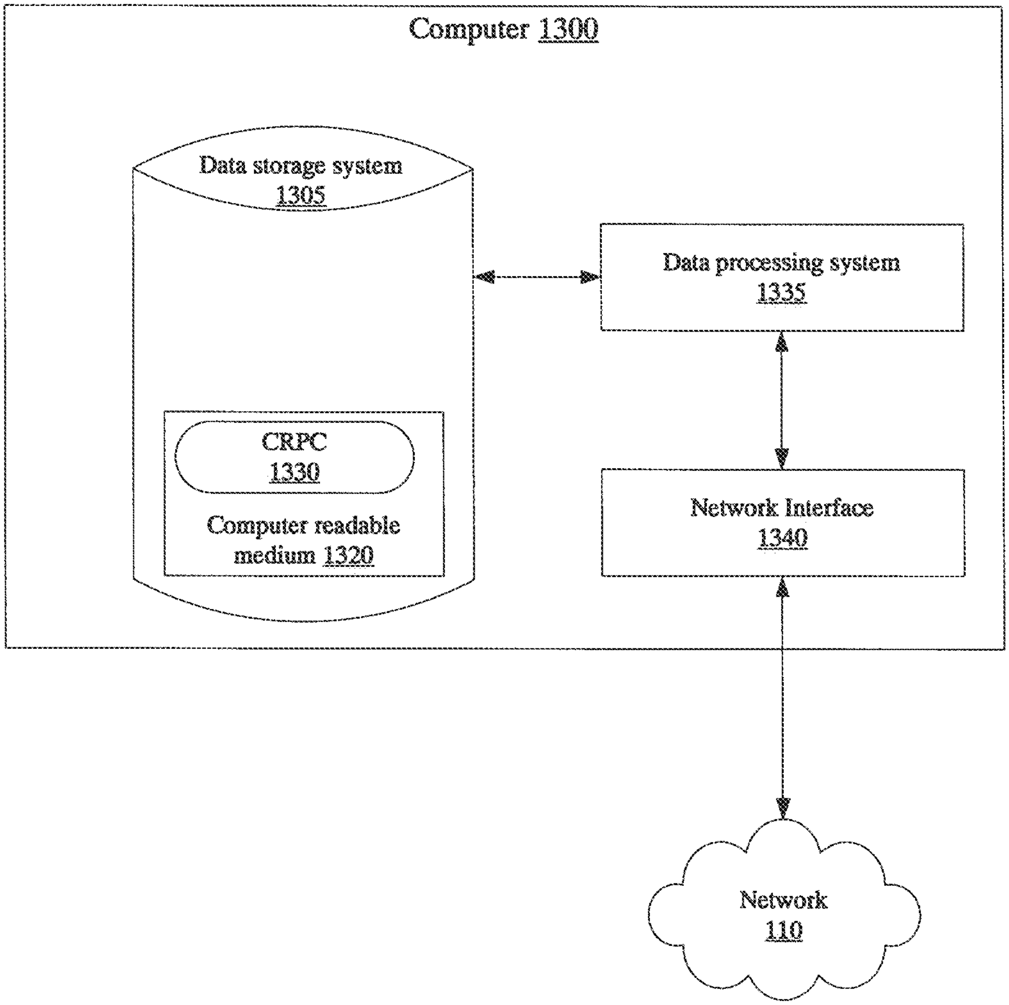
FIG. 13 illustrates a possible implementation for at least some components of a computer, according to some embodiments of the present invention.

FIG. 13 illustrates a possible implementation for at least some components of a computer, according to some embodiments of the present invention. The computer 1300 may correspond to any computing component illustrated in FIG. 1, including clients 105, servers 115, and/or nodes of cluster 120.

As shown in FIG. 13, computer 1300 may include a data processing system 1335. In some embodiments, data processing system 1335 may include any number of computer processors, any number of which may include one or more processing cores. In some embodiments, any of the processing cores may be physical or logical. For example, a single core may be used to implement multiple logical cores using symmetric multi-threading.

Computer 1300 also includes network interface 1340 for receiving messages (e.g., messages transmitted from a clients 105) and transmitting messages over network 110, and a data storage system 1305, which may include one or more computer-readable mediums. The computer-readable mediums may include any number of persistent storage devices (e.g., magnetic disk drives, solid state storage, etc.) and/or transient memory devices (e.g., Random Access Memory).

In embodiments where data processing system 1335 includes a microprocessor, a semantic inference and reasoning computer program product may be provided. Such a computer program product may include computer readable program code 1330, which implements a computer program, stored on a computer readable medium 1320. Computer readable medium 1320 may include magnetic media (e.g., a hard disk), optical media (e.g., a DVD), memory devices (e.g., random access memory), etc. In some embodiments, computer readable program code 1330 is configured such that, when executed by data processing system 1335, code 1330 causes the processing system to perform steps described above.

In other embodiments, computer 1300 may be configured to perform steps described above without the need for code 1330. For example, data processing system 1335 may consist merely of specialized hardware, such as one or more application-specific integrated circuits (ASICs). Hence, the features of the present invention described above may be implemented in hardware and/or software. For example, in some embodiments, the functional tiers described above may be implemented by data processing system 1335 executing computer instructions 1330, by data processing system 1335 operating independent of any computer instructions 1330, or by any suitable combination of hardware and/or software.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The semantic inference and reasoning engine (SIRE) described above offers many novel advantages over traditional systems. SIRE is able to manage the problems of scale in the reasoning process by applying a novel, multi-tier approach. The multitier approach may include clustering semantically related data artifacts and applying a network of inference engines to each cluster according to a static or dynamic schedule that manages data size, maximizes inferences, and minimizes error. The disclosed system is therefore uniquely positioned to address the search result problems that arise in cloud and/or Internet-scale data spaces, such as cloud-scale reasoning, semantic disambiguation of entities, search engine enhancement, semantic alerts based on incoming data, multi-granular semantic pattern detection, trend analysis, intelligence data mining, medical diagnosis, industrial competitive intelligence analysis, social network analysis, and other uses.

While various embodiments of the present invention have been described above, it should be understood that they have been presented by way of example only, and not limitation. Thus, the breadth and scope of the present invention should not be limited by any of the above-described exemplary embodiments.

As used herein, the term "semantic representation" may refer to any format that indicates entities and relationships. Although many examples are described herein using RDF, other semantic representations are possible in different embodiments.

As used herein, the term "data artifact" may be used to refer to any unit of content that can be included in and analyzed as part of the corpus, regardless of its particular form. For example, the data artifact may be a natural language document (e.g., email, report) or itself a semantic representation.

As used herein, the term "MapReduce" may be used to refer to a family of software frameworks for supporting distributed computing on large datasets according to the MapReduce pattern (i.e., distributing and performing work in parallel according to the "map" and "reduce" functions known in functional programming). The term "MapReduce" may refer to any software framework for implementing a MapReduce system, such as the open-source Hadoop package. Examples of implementing semantic reasoning using a MapReduce framework can be found in co-pending U.S. application Ser. No. 13/097,662, which is incorporated in its entirety herein by reference.

What is claimed:

1. A method of analyzing a corpus of data artifacts, the method comprising:

obtaining, by a computer, a semantic representation of the data artifacts, wherein the semantic representation indicates:

entities identified in the data artifacts; and semantic relationships among the entities, as indicated by the data artifacts;

clustering the data artifacts, by a computer, into clusters of semantically related data artifacts based on the semantic representation; and inferring, by a computer, additional semantic relationships between pairs of the entities, wherein the inferring comprises:

on a cluster-by-cluster basis, applying a multi-tiered network of inference engines to a portion of the semantic representation corresponding to the cluster, wherein the multi-tiered network of inference engines comprises a domain-independent inference tier and a domain-specific inference tier, wherein applying the multi-tiered network of inference engines comprises:

applying two or more inference engines sequentially, in parallel, or iteratively according to a static or dynamic schedule.

2. The method of claim 1, wherein obtaining the semantic representation comprises:

applying natural language processing techniques to extract the entities and relationships from natural language content contained of the data artifacts.

3. The method of claim 1, wherein obtaining the semantic representation comprises:

determining that the same entity is identified in the artifacts using different identifiers; and disambiguating the entity by replacing one or more of the different identifiers with a common identifier for the entity.

4. The method of claim 1, wherein clustering the data artifacts comprises:

performing a semantic analysis to determine semantic interrelatedness of the data artifacts based on respective ones of the entities and relationships in the data artifacts.

5. The method of claim 1, wherein clustering the data artifacts comprises: performing a syntactic analysis to determine syntactic interrelatedness of the data artifacts based on syntactic overlap of respective content of the data artifacts.

6. The method of claim 1, wherein the static or dynamic schedule is defined in one or more runtime configuration files.

7. The method of claim 1, wherein applying the multi-tiered network of inference engines comprises: applying a plurality of domain-independent inference engines in the domain-independent tier and subsequently applying a plurality of inference engines in the domain-specific tier.

8. The method of claim 1, wherein the clustering and inferring are implemented using a parallel programming and execution model.

9. The method of claim 8, wherein the parallel programming and execution model corresponds to a MapReduce framework.

10. The method of claim 1, further comprising:

receiving, by a computer, a query identifying one or more of the entities;

identifying, by a computer in response to the query, a cluster of data artifacts most relevant to the one or more entities, wherein the identifying is dependent on one or more of the obtained or :inferred semantic relationships.

11. A system comprising:

a parallel processing facility comprising:

a plurality of computer processing cores; and one or more memories coupled to the computer processing cores and storing program instructions executable by the processing cores to implement a semantic inference and reasoning engine configured to analyze a corpus of data artifacts by:

obtaining a semantic representation of the data artifacts, wherein the semantic representation indicates:

entities identified in the data artifacts; and semantic relationships among the entities, as indicated by the data artifacts;

clustering the data artifacts into clusters of semantically related data artifacts based on the semantic representation; and inferring additional semantic relationships between pairs of the entities, wherein the inferring comprises:

on a cluster-by-cluster basis, applying a multi-tiered network of inference engines to a portion of the semantic representation corresponding to the cluster, wherein the multi-tiered network of inference engines comprises a domain-independent inference tier and a domain-specific inference tier, wherein applying the multi-tiered network of inference engines comprises applying two or more inference engines sequentially, in parallel, or iteratively according to a static or dynamic schedule.

12. The system of claim 11 further comprising a distributed storage facility coupled to the parallel processing facility and storing the corpus of data artifacts.

13. The system of claim 12, wherein the storage facility comprises a distributed file system.

14. The system of claim 11, wherein the parallel processing facility comprises at least one of: a compute cluster, a superscalar supercomputer, a desktop grid, or a compute cloud.

15. The system of claim 11, wherein one or more memories further store program instructions executable to implement a parallel computation scheduling framework for executing the semantic inference and reasoning engine on the parallel processing facility using a MapReduce pattern.

16. The system of claim 11, wherein obtaining the semantic representation comprises: applying natural language processing techniques to extract the entities and relationships from natural language content contained of the data artifacts.

17. The system of claim 11, wherein clustering the data artifacts comprises at least one of:

performing a semantic analysis to determine semantic interrelatedness of the data artifacts based on respective ones of the entities and relationships in the data artifacts; and performing a syntactic analysis to determine syntactic interrelatedness of the data artifacts based on syntactic overlap of respective content of the data artifacts.

18. The system of claim 11, wherein applying the multi-tiered network of inference engines comprises: applying a plurality of domain-independent inference engines in the domain-independent tier and subsequently applying a plurality of inference engines in the domain-specific tier.

19. A method of analyzing a corpus of data artifacts, the method comprising:

obtaining, by a computer, a semantic representation of the data artifacts, wherein the semantic representation indicates:

entities identified in the data artifacts; and semantic relationships among the entities, as indicated by the data artifacts;

wherein obtaining the semantic representation comprises:

determining that the same entity is identified in the artifacts using different identifiers; and disambiguating the entity by replacing one or more of the different identifiers with a common identifier for the entity;

clustering the data artifacts, by a computer, into clusters of semantically related data artifacts based on the semantic representation; and inferring, by a computer, additional semantic relationships between pairs of the entities, wherein the inferring comprises:

on a cluster-by-cluster basis, applying a multi-tiered network of inference engines to a portion of the semantic representation corresponding to the cluster, wherein the multi-tiered network of inference engines comprises a domain-independent inference tier and a domain-specific inference tier.

20. A method of analyzing a corpus of data artifacts, the method comprising:

obtaining, by a computer, a semantic representation of the data artifacts, wherein the semantic representation indicates:

entities identified in the data artifacts; and semantic relationships among the entities, as indicated by the data artifacts;

clustering the data artifacts, by a computer, into clusters of semantically related data artifacts based on the semantic representation, wherein clustering the data artifacts comprises at least one of:

performing a semantic analysis to determine semantic interrelatedness of the data artifacts based on respective ones of the entities and relationships in the data artifacts; and performing a syntactic analysis to determine syntactic interrelatedness of the data artifacts based on syntactic overlap of respective content of the data artifacts; and inferring, by a computer, additional semantic relationships between pairs of the entities, wherein the inferring comprises:

on a cluster-by-cluster basis, applying a multi-tiered network of inference engines to a portion of the semantic representation corresponding to the cluster, wherein the multi-tiered network of inference engines comprises a domain-independent inference tier and a domain-specific inference tier.

21. A method of analyzing a corpus of data artifacts, the method comprising:

obtaining, by a computer, a semantic representation of the data artifacts, wherein the semantic representation indicates:

entities identified in the data artifacts; and semantic relationships among the entities, as indicated by the data artifacts;

clustering the data artifacts, by a computer, into clusters of semantically related data artifacts based on the semantic representation; and inferring, by a computer, additional semantic relationships between pairs of the entities, wherein the inferring comprises:

on a cluster-by-cluster basis, applying a multi-tiered network of inference engines to a portion of the semantic representation corresponding to the cluster, wherein the multi-tiered network of inference engines comprises a domain-independent inference tier and a domain-specific inference tier, wherein applying the multi-tiered network of inference engines comprises:

applying a plurality of domain-independent inference engines in the domain-independent tier and subsequently applying a plurality of inference engines in the domain-specific tier.

* * * * *